March 16, 1965 A. U. BRYANT 3,173,647
FLUID VALVE HAVING PRESSURE RESPONSIVE BONNET SEALS
Filed April 21, 1961 4 Sheets-Sheet 1

INVENTOR.
AUSTIN BRYANT
BY
Edward P. Frey
Attorney

March 16, 1965 A. U. BRYANT 3,173,647
FLUID VALVE HAVING PRESSURE RESPONSIVE BONNET SEALS
Filed April 21, 1961 4 Sheets-Sheet 2
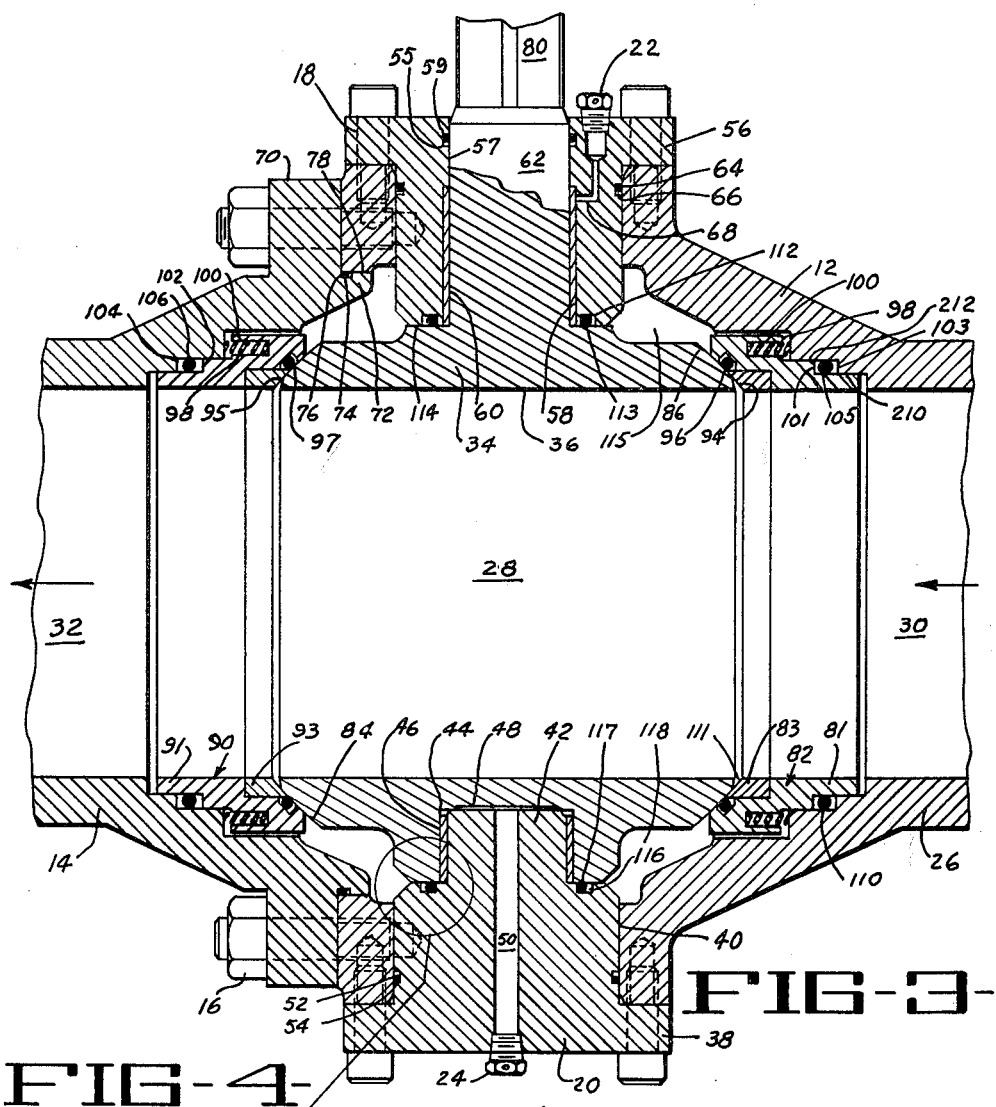
FIG-3-
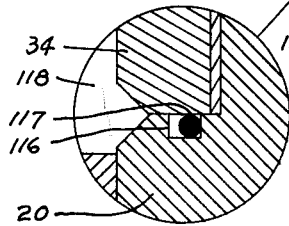
FIG-4-
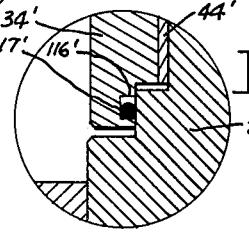
FIG-5-
INVENTOR.
AUSTIN BRYANT
BY
Attorney

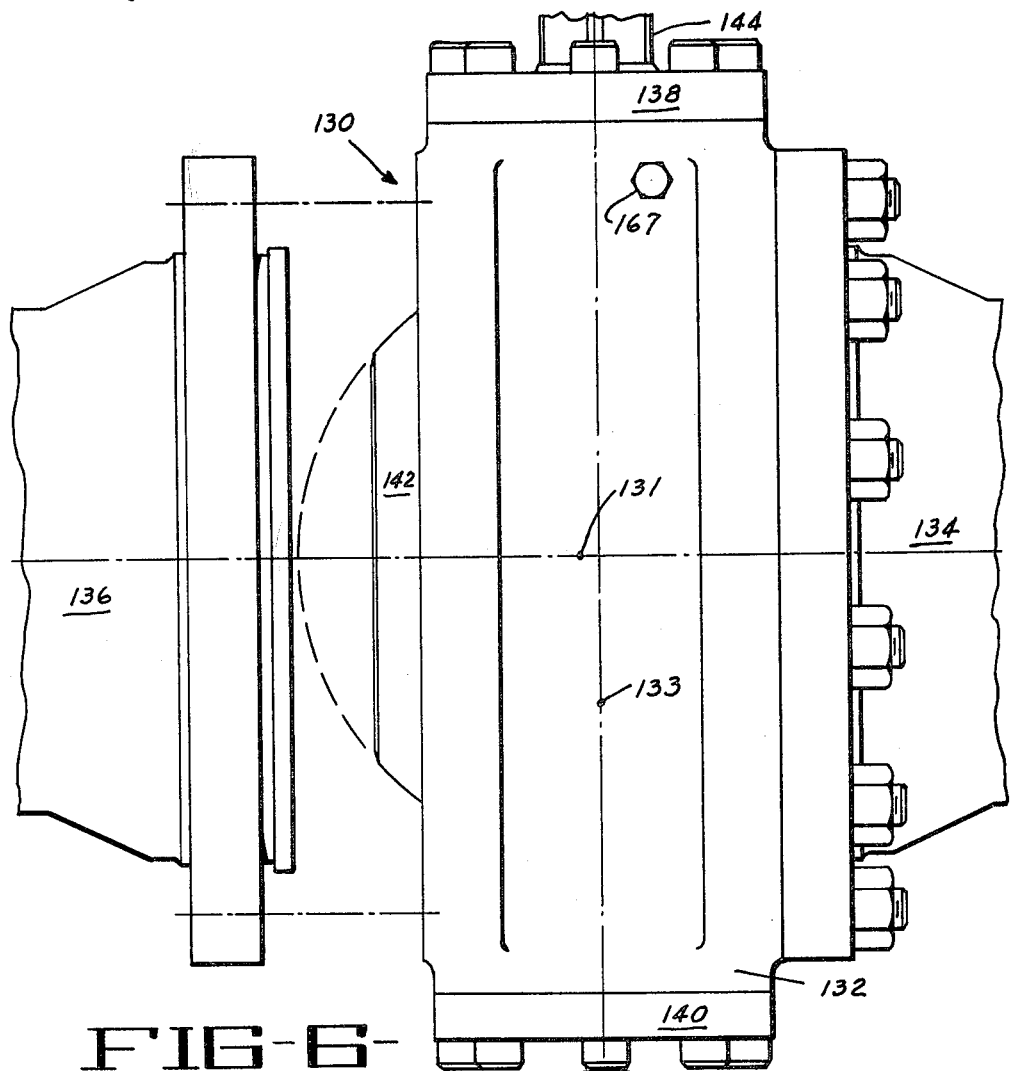
FIG-6-
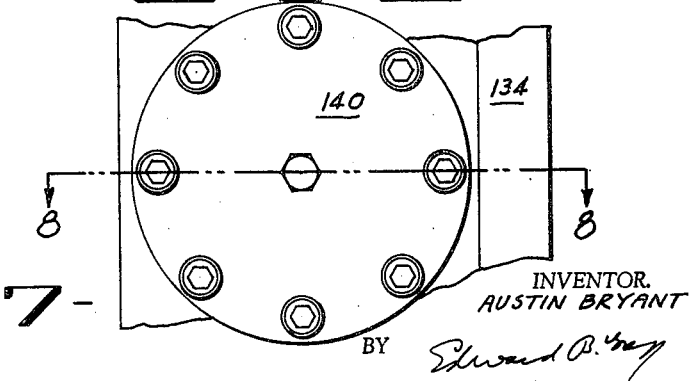
FIG-7-

March 16, 1965 A. U. BRYANT 3,173,647
FLUID VALVE HAVING PRESSURE RESPONSIVE BONNET SEALS
Filed April 21, 1961 4 Sheets-Sheet 4
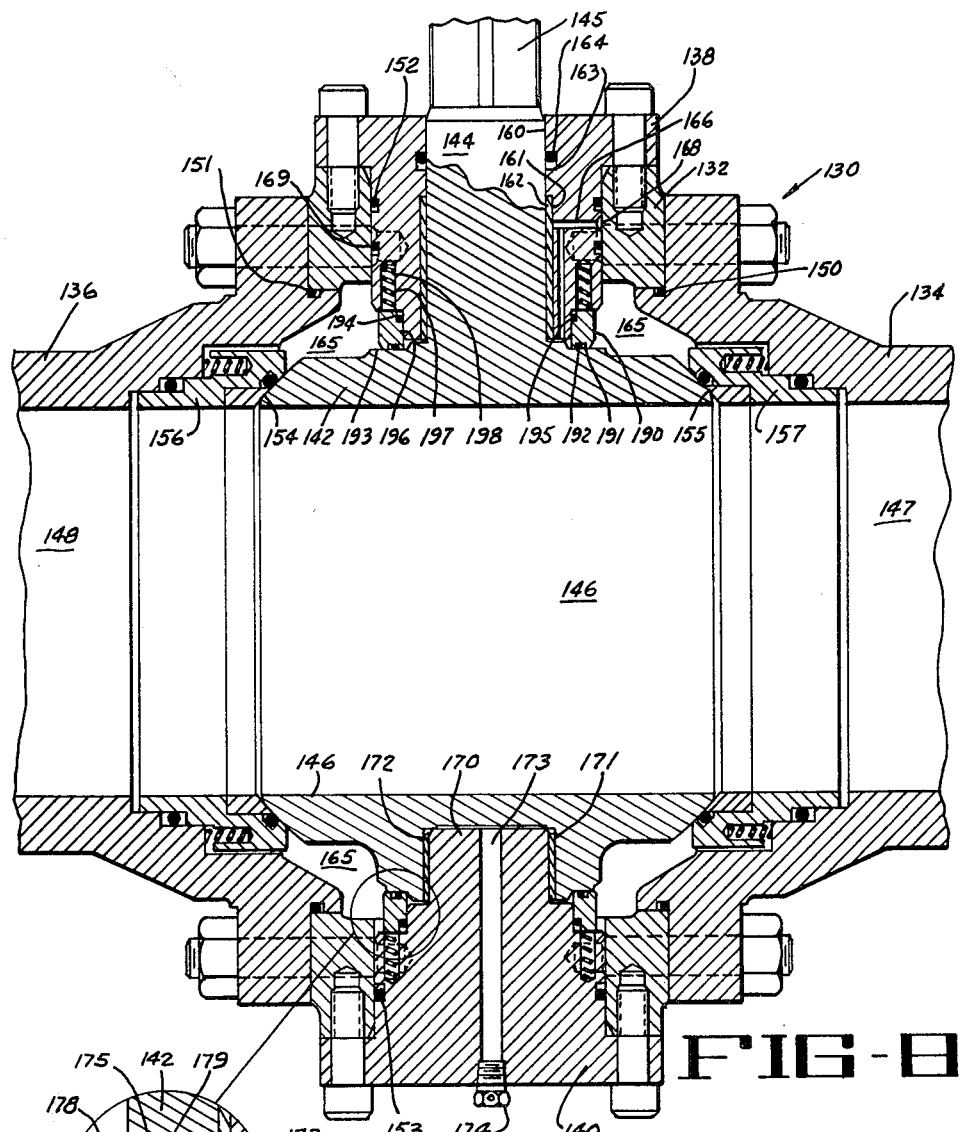
FIG-8-
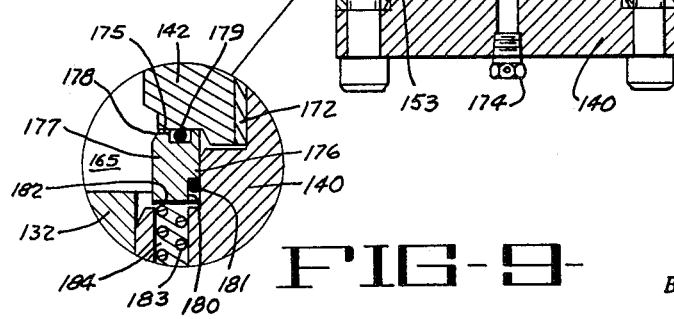
FIG-9-
INVENTOR.
AUSTIN BRYANT
BY

United States Patent Office 3,173,647
Patented Mar. 16, 1965

3,173,647
FLUID VALVE HAVING PRESSURE RESPONSIVE
BONNET SEALS
Austin U. Bryant, Walnut Creek, Calif., assignor to Grove Valve and Regulator Company, Oakland, Calif., a corporation of California
Filed Apr. 21, 1961, Ser. No. 104,644
13 Claims. (Cl. 251—172)

This invention relates to valves for controlling the flow of liquid and gaseous fluids and more particularly to valves which control fluid flow by means of a rotatable valve element of the plug type which is rotated between an open and a closed position.

In many industrial applications it is desirable to control the flow of liquids and gases, hereinafter referred to as fluids, between an input passage and an output passage by means of a valve element interposed between such passages. The valve element to which this invention relates can assume an open and a closed position by rotation of the element through a predetermined angle. Valves utilizing such a rotatable element include those generally known as ball valves, plug valves, butterfly valves and others having valve elements of spherical, cylindrical and disc configuration, respectively. This invention will be described with reference to ball valves, it being understood, however, that it relates to all valves having rotatable valve elements.

Some ball valves utilized heretofore have a valve element which seats upon a thrust type bearing (to support its weight) on its lower end and which is provided at its upper end with some means for attaching a valve stem. Such means may be in the form of a cut-out, bore or stud which mates with the lower end of the valve stem to form a connection for rotating the element when rotating the stem. The reason for providing a detachable valve stem is that assembly of conventional ball valves require the insertion of the valve element into the valve body through one of the flow passages and there is usually insufficient clearance for insertion of a valve element having an integral stem portion. The valve stem is inserted into the valve body and mated with the valve element through the opening upon which the upper bonnet is mounted.

Obviously, the machining of a seat on the valve stem and the necessity of having to provide a seat means in the valve element for mating or affixing the valve stem thereto is expensive and time-consuming upon assembly. Also since the valve element is rotatably journaled by journaling the valve stem, a good coaxial connection between valve stem and valve element is required if the element is to be firmly supported on both of its ends. Since such a connection is usually very difficult to accomplish, valve elements are often loosely connected to the stem so as to float on their upper end causing wear on the valve seat which now must guide the valve element. In some of the prior art valves, even the lower bearing is dispensed with to provide a floating valve element which causes hard operation. Further, such loosely supported valve elements are prone to vibrations.

Other types of prior art ball valves have included a valve element having a valve stem integrally attached thereto and which is inserted into the valve body through a bonnet opening. Obviously, valve bodies of this type had to be very bulky and heavy.

Prior art valves of the rotatable valve element type whether with an integral or a detachable valve stem also have caused difficulty with regard to providing a fluid tight seal between the valve element and the upper and lower valve bonnet. Unless properly sealed, fluid enters the bearings which rotatably journal the upper and lower valve element portions making it difficult to properly lubricate the bearings and also making it impossible to properly vent the bearings to the atmosphere. Providing proper sealing is difficult for two reasons, first wear of the bearing introduces a certain amount of play causing motion of the valve element in the direction of the flow passages. Second, when the valve is subjected to large fluid pressures, the valve body expands and thereby causes the axially aligned upper and lower bonnet to be moved outwardly. The seal for properly sealing the valve element to the upper end lower bonnets therefor must maintain a fluid tight seal in the face of a sideway motion caused by bearing slop and an up and down motion caused by expansion and contraction of the valve body. Valve elements including a valve stem as an integral part thereof have the advantage of requiring a shorter bearing and do not deflect and bind in the bearing.

It is a general object of this invention to provide a valve having a light and simple valve body which permits utilization of valve elements with either an integral or a detachable valve stem and which is provided with a novel bonnet to valve element seal substantially independent of valve element bearing slop and valve body expansion and which is further provided with a novel fluid passage to valve element seal ring which is continually urged into sealing contact with the valve element regardless of whether the valve is closed, half open or fully open.

It is also an object of this invention to provide a valve including a valve element having a valve stem as an integral part thereof and a valve body of light and simple construction.

It is a further object of this invention to provide a valve having a rotatable valve element which is more economical to make and to assemble than valves known heretofore and which are virtually vibration-proof.

It is a still further object of this invention to provide a valve of the rotating valve element type having its valve element firmly supported about its axis of rotation and which valve element includes a valve stem portion as an integral part thereof which may be inserted into the valve body through an open side in the valve body.

It is a further object of this invention to provide a valve of the rotating valve element type with a fluid tight seal between its valve element and its upper and lower valve bonnet respectively which is virtually insensitive to motion of the valve element caused by bearing wear and to motion of the upper and lower valve bonnets caused by expansion and contraction of the valve body and which seal is useful for floating and fixed valve elements having either a valve stem which is integral with or separate from the valve element.

It is a still further object of this invention to provide a valve which is more economical, rugged, easier to assemble and to maintain than valves known heretofore and which have a longer useful life due to a novel seal means which maintains a fluid tight seal independent of bearing wear and degree of expansion of the valve body.

It is a still further object of this invention to provide a valve having an improved floating seal between a flow passage and the valve element which is continually urged by fluid pressure against the valve element regardless of whether the valve is closed, open or half open.

Other objects and a fuller understanding of the invention may be had by referring to the following description and claims, taken in connection with the accompanying drawings, in which:

FIGURE 3 shows a cross-sectional view taken along line 3—3 of FIGURE 2.

FIGURE 4 shows an enlarged cross-sectional view of the bonnet seal detail encircled in FIGURE 3 which provides a fluid tight seal insensitive to bearing slop.

FIGURE 5 shows an enlarged cross-sectional view of an alternate embodiment of a bonnet seal especially useful in providing a fluid tight seal insensitive to valve body expansion and contraction.

FIGURE 6 shows a side elevational view partially exploded, of a valve having both fluid passage housings detachably mounted to the valve body.

FIGURE 7 shows a fragmentary top view of the valve of FIGURE 6.

FIGURE 8 shows a cross-sectional view taken along line 8—8 of FIGURE 7.

FIGURE 9 shows an enlarged cross-sectional view of the floating lower bonnet ring which provides a fluid tight seal between the valve element and the lower bonnet regardless of valve body expansion and contraction and bearing slop.

Figure 1:
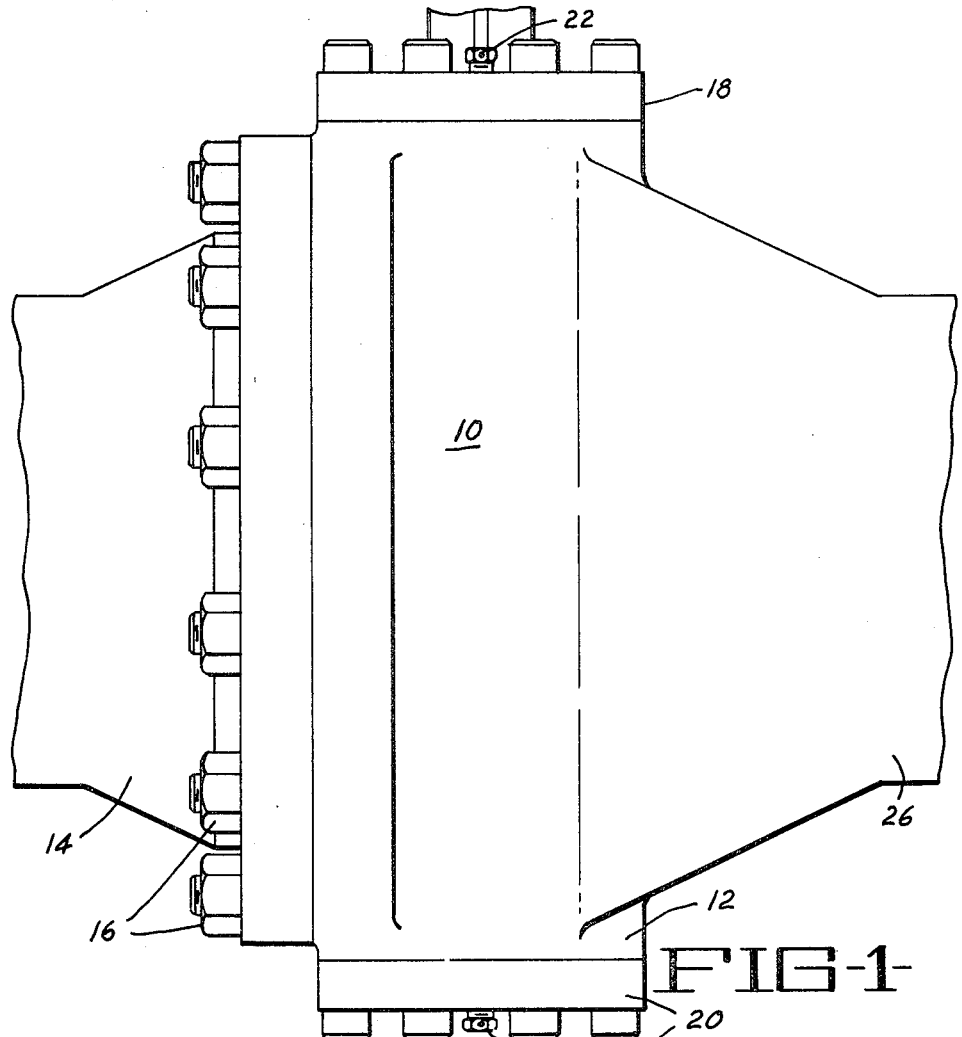
FIGURE 1 shows a side elevational view of a valve having one fluid passage housing detachably mounted to the valve body.
Figure 2:
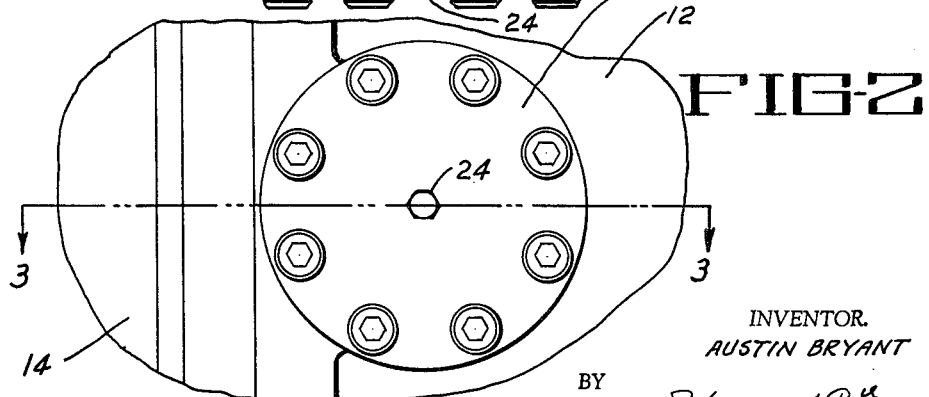
FIGURE 2 shows a fragmentary top view of the valve of FIGURE 1.

Referring now to the drawings, in which like reference characters designate like parts, and particularly to FIGURES 1 and 2 thereof, there is shown a ball type valve 10 having a valve body 12, a fluid passage housing 14 bolted to body 12 by a set of screws 16, an upper bonnet 18 and a lower bonnet 20. Upper and lower bonnets 18 and 20 respectively fastened to valve body 12 by screws and include threaded vent plugs 22 and 24 which cap a pair of vents and include a passage to communicate the vents to the atmosphere as will be explained presently. As can be seen from FIGURE 1, valve body 12 includes, as an integral part thereof, a fluid passage housing portion 26 which has, as will presently be shown, a flow passage for fluid flow which is in axial alignment with a fluid passage contained in detachable housing 14.

Valve body 12 is provided with an inner space 28, FIGURE 3, located between fluid passage 30 in housing portion 26 and fluid passage 32 in housing 14. A valve element 34 of spherical shape which has an inner cylindrical bore 36 is disposed in inner space 28 and rotatably journaled by bonnets 18 and 20. Lower bonnet 20 is of cylindrical shape and has a flange 38, containing a number of holes through which screws may be inserted to bolt it to body 12. Lower bonnet 20 is also provided with a cylindrical boss 40 dimensioned to fit into a corresponding cylindrical bore in housing 12 and a cylindrical end portion 42 dimensioned to fit into a corresponding cylindrical bore of a bearing 44 which may be made of Teflon impregnated sintered metal or may comprise a ball bearing or an antifriction bearing of the type well known to those skilled in the art. Bearing 44 fits into a cylindrical bore 46 in valve element 34. Boss 40 provides a thrust bearing element upon which valve element 34 is supported. Cylindrical bore 46 includes a small undercut 48 which is in communication with vent 50 in lower bonnet 20. A resilient O-ring type gasket seal 52 contained in a recess 54 cut into cylindrical body 40 serves to provide a fluid tight seal between bonnet 20 and body 12.

Upper bonnet 18 has the configuration of a sleeve having a top flange 56 for fastening it to housing 12 and an undercut portion 58 within its bore 57 containing space for a bearing 60 whose inner diameter is preferably but not necessarily of the same size as bore 57. Bore 57 is dimensioned to provide a good sliding fit with valve stem 62 which is rotationally supported by bearing 60. A resilient upper bonnet O-ring type gasket seal 64 contained in a recess 66 cut into the outer surface of bonnet 18 serves to provide a fluid tight seal between bonnet 18 and body 12. Also, a recess 55 cut into bore 57 and containing resilient stem O-ring type gasket seal 59 serves to provide a fluid tight seal to one side of the space occupied by bearing 60 which is in communication with a vent 68 in bonnet 18. Vent 68 is shown as capped by vent plug 22 which includes a passage for communicating with the atmosphere. In case of failure of the fluid tight seal between the valve elements and one of the bonnets, vents 50 and 68 may be plugged up with a solid vent plug to prevent fluid leakage from the valve.

As already mentioned, fluid passage housing 14 is detachable from body 12 and hence must be fluid tightly connected thereto. Housing 14 is provided with a flange 70 and a cylindrical boss 72 which contains a recess 74 accommodating a resilient O-ring type gasket seal 76. Valve body 12 is provided with a cylindrical bore 78 dimensioned to accommodate boss 72. O-ring type seal 76 is radially pressed against the surface of bore 78 to provide a fluid tight seal between housing 14 and body 12.

Valve stem 62 which is shown as being an integral part of valve element 34 has a square or hexagonal end portion 80 to which a mating wrench or hand wheel may be affixed for rotating valve element 34 between its closed and its open position. Valve element 34 with its integral stem 62 may be inserted into valve body 12 the following way. Both upper and lower bonnets 18 and 20 and also housing 14 are removed. Valve element 34 is then inserted (neglecting for the moment, valve seat 82), stem first, into body 12 with a turning motion so that stem 62 passes through the opening into which upper bonnet 18 fits. Thereafter the valve may be assembled by inserting the two bonnets and attaching the housing.

Valve element 34 is provided with two working surfaces 84 and 86 which respectively seal off passages 32 and 30 when valve element 34 is in its closed position. Interposed between valve element 34 and the fluid passages are a pair of floating seat rings 82 and 90 comprising respectively outer seat rings 81, 91 and inner seal rings 83, 93. Resilient O-ring type seal rings 96 and 97 are held in place in recesses formed between respective outer and inner seat rings 81, 83 and 91, 93 and provided a resilient seal means in corresponding surfaces 94 and 95. Seal rings 82 and 90 are respectively urged against valve element 34 by a plurality of circumferentially positioned helical compression springs 98 housed in cylindrical bores 100. Of course, individual springs 98 may be replaced by single coil, wave or Belleville springs.

Outer seat rings 81 and 91 are provided with shoulders 101 and 102 respectively, and passages 30 and 32 are provided with opposing shoulders 103 and 104. A resilient O-ring type gasket seal 105 is contained in the space between opposing shoulders 101, 103 and opposing cylindrical surfaces of passage 30 and outer seat ring 81 and is radially compressed to form a fluid tight seal between seat ring 82 and passage 30. Similarly a resilient O-ring type gasket seal 106 is provided in the space formed between opposing shoulders 102, 104 and opposing cylindrical surfaces in passage 32 and outer seat ring 91 to form a fluid tight seal bewteen seat ring 90 and passage 32.

The operation of seat ring 82 will now be explained. O-ring 105 has an inner diameter $D_1$ which is the same as the diameter of cylindrical surface 210 and an outer diameter $D_2$ which is the same as the diameter of cylindrical surface 212. The diameter of the circle of contact between O-ring 96 and working surface 86 will be referred to as $D_3$. Assuming passage 30 to be the upstream side, fluid under high pressure enters the spaces 110 and 111. In space 110, high fluid pressure will move O-ring 105 against shoulder 101, the pressure acting over a piston area proportionate to one of diameter $D_2$ and to urge the seat ring 82 towards the downstream side. Fluid in space 111 will exert high pressure against seat ring 82 in the upstream direction, the pressure acting on an area proportionate to a piston of diameter $D_3$, i.e. the seal diameter of the O-ring 96 less the internal diameter of the seat ring 82. Consequently, as long as $D_3$ is smaller than $D_2$ the differential pressure upon seat ring 82 is in the downstream direction and seat ring 82 is urged by fluid pressure against valve element 34.

On the downstream side, assuming O-rings 106 and 97 to have the same dimensions as the corresponding upstream O-rings, seat ring 90 is likewise urged against valve element 34 by fluid pressure provided that $D_3$ is larger than $D_1$. Fluid pressure from body space 115 pushes O-ring 106 against shoulder 104 and, since fluid pressure is the same in all directions, pushes shoulder 102 in the upstream direction. In other words, body fluid pressure entering the space between valve housing 14 and seat ring 90 from the body space 115 urges seat ring 90 upstream with a force equal to that exerted upon a piston of the diameter of seat ring 90 having a central opening of diameter $D_1$. Body fluid from the space 115 also enters the space between valve element 34 and seat ring 90 to a depth determined by seating diameter $D_3$ of O-ring 97 and pushes seat ring 90 downstream. This pressure corresponds to the force on a cylinder of the diameter of the seat ring 90 having a central opening of diameter $D_3$. Since $D_3$ is larger than $D_1$, the central opening of this piston is larger and hence, the force in the upstream direction is larger than the force in the downstream direction and seat ring 90 is continually urged against valve element 34. Accordingly the O-ring recesses in the seat rings of this invention ae dimensioned so that $D_3$ is larger than $D_1$ and smaller than $D_2$.

To provide a fluid tight seal between upper bonnet 18 and valve element 34, a recess 112 is cut into the end face of upper bonnet 18 which faces a shoulder 114 of valve element 34. A resilient O-ring type seal 113 in recess 112 provides the seal which seals off space 115 from bearing 60. Similarly a recess 116 housing a resilient O-ring type seal 117 in a shoulder of lower bonnet 20 seals off bearing 44 from space 118 as shown in greater detail in FIGURE 4. In this manner the spaces containing bearings 44 and 60 are sealed from the fluid pressure within the valve. Only vents 50 and 68 communicate with the spaces occupied by the bearings. As already explained, the bearing spaces are vented to the atmosphere through holes or slots in vent caps 22 and 24 except in case of seal failure when solid plugs may be used to seal the vents.

In order that valve element 34 is neither urged upward toward upper bonnet 18 nor urged downward against lower bonnet 20 by body fluid pressure, i.e., that there is no differential pressure parallel to the axis of rotation and the valve element, it is important that the diameter of O-ring type seals 113 and 117 be equal. In other words, since the pressure in spaces 115 and 118 is equal, the area exposed to this pressure must likewise be equal so that no net differential force in the direction of valve stem 62 acts on valve element 34.

As has already been alluded to, after constant use or due to misalignments, bearings 44 and 60 may become somewhat sloppy causing motion of valve element 34 in the downstream-upstream direction. As long as resilient O-ring type seals 113 and 117 are housed in recesses cut into surfaces extending parallel to the direction of motion of valve element 34, such motion will not cause impairment of the fluid tight seal. Consequently, to prevent impairment of the fluid tight seal due to bearing slop, the recess for the resilient seal rings should be cut into surfaces parallel to such motion as shown in FIG. 4.

In cases where valves are exposed to very high pressures, expansion of body 12 will occur which, if sufficiently severe, may cause impairment of the fluid tight seal and leakage of fluid between valve element 34 and bonnets 18 and 20. To avoid such leakage due to body expansion, it has been found desirable to provide recesses for accommodating the resilient seal rings in surfaces coaxial with the axis of rotation of valve element 34 as shown in FIG. 5. For example, a recess 116' cut into a tubular extension of valve element 34' accommodates a resilient seal ring 117' which is in contact with a cylindrical surface of lower bonnet 20'. Of course, the recess may also be cut into the center cylindrical surface of the boss of bonnet 20' to bear against the inner surface of element 34. Similarly, recesses may be cut into the stem portion of valve element 34 and upper bonnet 18 so that expansion of body 12 results in parallel motion of the mating surfaces between element 42 and bonnet 18. The exact location of the recess accommodating the resilient seal ring may be selected to suit individual requirements.

In certain instances seals between rotatable valve elements and bonnets may be desired which are insensitive to both bearing slop and body expansion. Such a seal will be described in connection with FIG. 8 in which the surfaces into which recesses are cut will be orthogonal and adjacent.

A valve 130, shown in FIGURES 6, 7 and 8, includes a valve body 132 which is structurally much simpler than valve body 12 of FIGURE 1 in that it does not include a body portion whose inner bore defines one of the flow passages. Instead, valve body 132 is very narrow and symmetrical about a plane containing axis 133 which plane is perpendicular to fluid flow axis 131. Valve body 132 may be said to have open sides and essentially comprises a solid piece of material having a horizontal bore concentric about axis 131 and a vertical bore concentric with axis 133. Axes 131 and 133 intersect. Flow passage housing 134 and 136, defining flow passages 147 and 148 respectively, are affixed to opposite sides of valve body 132 to close off the horizontal bores. The method of affixing housings 134 and 136 to valve body 132 is conventional, it being shown as fastened thereto by a set of circumferentially spaced threaded studs held in tapped holes situated in body 132.

A valve element 142 of spherical shape and having a cylindrical bore 146 (see FIG. 8) is disposed in an inner space between affixed flow passages 147 and 148. The axis of bore 146 coincides with fluid flow axis 131 when valve element 142 is in its open position to provide smooth communication between flow passages 147 and 148. Valve element 142 is rotatably journaled in valve body 132 by means of an upper and lower bonnet 138 and 140, which also serve to cap opposite ends of the vertical bore.

Valve 142 has a stem portion 144 which terminates in a square or hexagonal cross-sectional portion 145 for engagement with an operating wrench or a hand wheel (not shown) in the customary manner.

Fluid tight seals between fluid passage housings 134, 136, upper and lower bonnets 138, 140, and valve body 132 are provided in the conventional manner by utilizing resilient O-ring type gasket seals 150, 151, 152 and 153 accommodated in suitable recesses. Valve element 142 is also provided with a customary pair of working surfaces 154 and 155 which cooperate with a pair of floating seat rings 156 and 157 slidingly supported in fluid passage housings 136 and 134, respectively, in the manner explained in connection with the description of FIGURE 3. Furthermore, the construction of upper and lower bonnets 138, 140 and bearings 162, 172 for journaling valve element 142 are similar in most respects to upper and lower bonnet 18, 20 and bearings 44, 60 of FIGURE 3. Briefly, upper bonnet 138 has a bore 160 which is recessed at 161 to accommodate a bearing 162 which may be made of Teflon impregnated sintered metal or any other well known non-friction material. The inner diameter of bearing 162 is preferably the same as diameter of bore 160 and is dimensioned for rotatable engagement with valve stem 144.

Recess 163 containing resilient O-ring type seal 164 provides a fluid tight seal between stem 144 and upper bonnet 138 and thereby seals off one side of the space occupied by bearing 162. As will be explained hereinafter, space 165 is fluid tightly sealed from the other side of space in which bearing 162 is located. This bearing space is in communication with a vent 166 capped by a slotted vent plug 167 for communication with the atmosphere (FIG. 6). Since it is usually too difficult and time-consuming to align vent 166 with vent plug 167, it has been found expedient to provide a small annular groove 168 in the outer surface of upper bonnet 138 in the same plane as vent 166 and communicate the tapped hole for vent plug 167 with annular ring 168. To provide a fluid tight seal between space 165 and annular groove 168, resilient O-ring type seal 169 located in a suitable recess below annular groove 168 may be used.

Lower bonnet 140 includes a circular end boss 170 surrounded by bearing 171 made of Teflon impregnated sintered metal or other similarly known bearing materials, which engages a circular bore 172 cut into valve element 142. The bottom of bore 172 is somewhat undercut to communicate with a vent 173 which is capped by vent plug 174 for communication with the atmosphere.

Referring now to FIGURES 8 and 9 there is shown in detail a floating seat means providing a fluid tight seal between space 165 and bearing 172 which is virtually independent of bearing slop and valve body expansion and contraction. Valve element 142 and lower bonnet 140 are respectively provided with a pair of sealing surfaces 175 and 176 which are perpendicular to one another and surround the axis of rotation of valve element 142. A rigid annular lower bonnet seat ring 177 surrounding lower bonnet 140 has two surfaces complementary to surfaces 175 and 176 each of which is provided with a recess 178 and 180 for accommodating a pair of resilient O-ring type seals 179 and 181. It will be obvious to those skilled in the art that recess 180 may also take the form of a recessed cut out which provides two wall supports. Seat ring 177 through seals 179 and 181 provides a fluid tight seal between space 165 and the space occupied by bearing 172.

A set of annularly spaced helical coil springs, one of which is shown and designated as 183, are provided to press against surface 182 to urge seat ring 177 against valve element 142. Expansion springs such as 183 may be housed in circular bores 184 in lower bonnet 140.

An annular upper bonnet seat ring 190 is utilized in much the same manner to provide a fluid tight seal between space 165 and the space occupied by bearing 162 which is substantially independent of bearing slop and valve body expansion and contraction. Upper bonnet seat ring 190 includes a recess 191 cut into its annular end face which accommodates a resilient O-ring type seal which engages a corresponding annular surface 193 of valve element 142. A recess portion 194 cut into the inner cylindrical surface of seat ring 190 accommodates a resilient O-ring type seal 195 in communication with corresponding cylindrical surface 196 of upper bonnet 138. Bonnet 138 is also provided with a number of cylindrical bores such as bore 197 for accommodating helical coil springs 198. Instead of coil spring 183 and 198 which require a set of individual bores 184 and 197, seat rings 177 and 190 may be urged against valve element 142 by a single coil, wave or Belleville spring.

In operation, bonnet seat ring 177 being capable of limited up and down motion by providing clearance in the space its occupies is urged against surface 175 of valve element 142 by a spring means such as the spring 184. Fluid from space 165 can enter the space between the corresponding surfaces of valve element 142 and bonnet seat ring 177 up to the point of contact between O-ring seal 179 and valve element 142. Fluid also can enter the space between face 182 and valve bonnet 140 up to the point of contact between O-ring seal 81 and the corresponding surface of bonnet 140.

Since the force upon a body immersed in a fluid is equal to pressure of the fluid times area over which it acts, the differential force exerted by the body fluid in space 165 upon seat ring 177 is equal to the difference in the horizontal areas to which the fluid has access. As is immediately apparent from FIGURE 9 the area giving rise to an upward force, that is the force upon face 182, is greater than the area giving rise to a downward force between the point of tangency of O-ring 179 and surface 175 and consequently fluid pressure continually urges seal ring 177 against valve element 142. It is also apparent from FIGURE 9 that as valve body 132 extends under the force of very great fluid pressure, lower valve bonnet 140 moves downward but remains parallel to the inner cylindrical surface of seat ring 177. Consequently, such downward movement will have little effect on the fluid tight seal provided by O-ring 181 since such motion is parallel to the surface containing recess 180. The same reasoning can be applied to contraction of valve body 132 which may occur as pressure of the fluid therethrough is decreased.

Likewise, should wear of cylindrical boss 170, bearing 171, or cylindrical bore 172, cause sloppy journaling of valve element 142 resulting in a slight horizontal motion of valve element 142, the fluid tight seal provided by seal ring 179 will be essentially unaffected by such motion. The reason why the fluid tight seal provided by O-ring 179 remain unaffected by such horizontal motion is, of course, that surface 175 remains parallel to the surface containing recess 178 and consequently, O-ring seal 179 is not lifted away from surface 175. The operation of seal ring 190 is in all respects, the same as the operation explained in connection with seal ring 177. It can therefore be seen that by providing bonnet seat rings 177 and 190 which are capable of limited motion parallel to the direction of the axis of rotation of valve element 142 and which are urged against the valve element, a fluid tight seal is provided between valve element 142 and bonnets 138 and 140 respectively, which fluid tight seal is substantially independent of body expansion and of bearing slop.

The bonnet seat rings of this invention may be utilized together with the seal shown in FIG. 4 so that only a single seat ring is required. As the valve body expands under great pressure, the single bonnet floating seat ring is urged by the body fluid against the valve element forcing the valve element to remain in contact with the seal dispersed in a flat end face as shown in FIGURE 4. Also, the floating bonnet seat ring can be utilized to provide a seal between a bonnet and a valve element where the valve stem is detachable so that one side of the valve element is floating. Further, floating bonnet seat rings have been found useful for valves having both ends of the rotatable valve element unsupported, i.e., a floating valve element.

There has been described a valve of the rotatable valve element type which provides an improved fluid tight seal which is substantially independent of valve body expansion and which is not affected by wear in the bearing supporting the valve element. Furthermore, the valve element described herein may be provided with a valve stem which is an integral portion of the valve element resulting in a substantial saving in the manufacturing of such valve element without any loss of precision or efficiency. Also the valve of this invention includes improved seat rings for sealing the flow passages which seat rings are continually urged against the valve element on the upstream and downstream side. In order to permit the insertion of valve elements having a steam as an integral portion thereof into the valve body, the valve body includes at least one detachable flow passage housing which is bolted to the valve body. Further, substantial saving may be realized by utilizing two detachable flow passage housings so that the valve body essentially comprising a block having two orthoganol straight cylindrical bores therethrough and which thereby may be said to have open sides.

What is claimed is:

1. A value construction comprising: a valve body including flow passages; a body space between said flow passages and a bonnet opening; a valve element disposed in said body space and rotatable between an open and a closed position, said valve element having a flat sealing surface concentric with its axis of rotation; a bonnet disposed in said bonnet opening for rotatably journaling one end of said valve element; an annular bonnet seat ring having a flat end face opposite said flat sealing surface, said seat ring being carried by said bonnet and being capable of being urged independently of said bonnet against said flat sealing surface, adjacent portions of said seat ring and said bonnet forming an annular space defined by radially spaced concentric surfaces; first and second resilient seals of the O-ring type, said first O-ring being disposed between said flat sealing surface and said flat end face and being retained in a retaining means included in one of said opposed surfaces whilst being in seating contact with the other one of said opposed surfaces, said second O-ring being disposed between said concentric surfaces and being retained in a retaining means included in one of said concentric surfaces whilst being in sealing contact with the other one of said concentric surfaces; spring means between said bonnet and said seat ring for urging said seat ring against said flat sealing surfaces, the mean diameter of said first O-ring being greater than the seal diameter of said second O-ring defined by the sealing contact thereof with said other concentric surface, the circumferential surface of said seat ring other than said concentric surface thereof and the annular surface thereof other than said flat sealing surface being free of sealing means with said bonnet and said valve element to enable free flow of fluid between said other annular surface and said sealing surface, and said other circumferential surface being exposed to pressure in said valve body.

2. A valve construction in accordance with claim 1 in which valve element includes an integral valve stem portion and in which said bonnet includes an opening for receiving said valve stem.

3. A valve construction in accordance with claim 1 in which said valve body is provided with a further bonnet opening and in which a further bonnet is disposed in said further opening for rotatably journaling the other end of said valve element.

4. A valve construction in accordance with claim 3 in which said valve element includes a further flat sealing surface concentric with its axis of rotation; a further annular bonnet seat ring having a further flat end face opposite to said further flat sealing surface, said further seat ring being carried by said further bonnet and being capable of being urged independently of said further bonnet against said further flat sealing surface, adjacent portions of said further seat ring and said further bonnet forming an annular space defined by radially spaced concentric surfaces; third and fourth resilient seals of the O-ring type, said third O-ring being disposed between said further flat sealing surfaces and said further end face and and being retained in a retaining means included in one of said further opposed surfaces whilst being in sealing contact with the other of said further opposed surfaces, said fourth O-ring being disposed between said further concentric surfaces and being retained in a retaining means included in one of said further concentric surfaces whilst being in sealing contact with the other of said further concentric surfaces; spring means between said further bonnet and said further seat ring for urging said further seat ring against said further flat sealing surface, the mean diameter of said third O-ring being greater than the seal diameter of said fourth O-ring defined by the sealing contact thereof with said other further concentric surface, the circumferential surface of said further seat ring other than said further concentric surface thereof and the annular surface thereof other than said further flat end face being free of sealing means with said bonnet and said valve element to enable free flow of fluid between said other annular surface and said further flat end face and said other circumferential surfaces being exposed to pressure in said valve body.

5. A valve construction in accordance with claim 4 in which the mean diameter of said first and third O-ring is equal and in which the inner diameter of said second and fourth O-ring is equal.

6. A valve construction in accordance with claim 3 in which said further bonnet includes a flat end surface and in which said valve element includes a further flat sealing surface disposed opposite to said flat end surface; a third resilient O-ring type seal being disposed between said further flat sealing surface and said further flat end surface and being retained in a retaining means by one of said opposed surfaces whilst being in sealing contact with the other one of said opposed surfaces.

7. A valve construction comprising: a valve body having removable flow passage housings defining flow passages, removable upper and lower bonnets and a body space between sad flow passages, a valve element disposed in said body space and rotatable about a valve element axis between an open and a closed position, said valve element having two working surfaces concentric with an axis perpendicular to said valve element axis and two sealing surfaces concentric with said valve element axis; rigid seat ring means surrounding said flow passages and having one end face disposed opposite said working surface and being carried by said flow passage housings and being capable of being urged independently of said flow passage housings against said working surfaces, adjacent portion of said rigid seat ring means and said flow passage housings forming closed annular spaces defined by radially spaced concentric surfaces together with one shoulder face forward of said rigid seal ring means and another opposed shoulder face more remote from said working surfaces and formed in said flow passage housing; further rigid seat ring means surrounding said upper and lower bonnets and having one end face disposed opposite said sealing surfaces and being carried by said upper and lower bonnets respectively and being capable of being urged independently of said upper and lower bonnets against said seating surfaces, adjacent portions of said further rigid seat ring means and said upper and lower bonnets respectively forming annular spaces defined by radially spaced concentric surfaces; first resilient O-ring seals disposed respectively between the end faces of said seat means and said working surfaces to seal against fluid leakage between said seat means and said valve element; second resilient O-ring type seals disposed respectively between the end faces of said further seat means and said sealing surfaces to seal against fluid leakage between said further seat means and said valve element; and a third resilient O-ring type seal disposed between said radially concentric surfaces to seal against fluid leakage between said seat means and said fluid passages and a fourth O-ring disposed and sealing between said further seat means and said upper and lower bonnet respectively, the internal diameter of said fourth O-ring being smaller than the mean diameter of said second O-ring, the circumferential surface of each of said further rigid seat ring means other than said concentric surface thereof and the annular surface thereof other than said one end face being free of sealing means with said bonnet and said valve element to enable free flow of fluid between said other annular surface and said one end face, and said other circumferential surface being exposed to pressure in said valve body space.

8. A valve construction in accordance with claim 7 in which the first O-ring associated with the end face of said seat means has a mean diameter between the inner and outer diameter of the third O-ring associated with the radially concentric surfaces of said seat means.

9. A structure of the rotatable valve type comprising:
an outer body member having inlet and outlet openings,
an inner member rotatable in said body member and having surfaces thereon alignable with said inlet and said outlet openings,
a flat circular sealing surface on one of said outer and inner members, a cylindrical sealing surface on the other of said outer and inner members, said sealing surfaces being concentric with the axis of rotation of said inner member, an annular seat ring having a cylindrical face slidable on said cylindrical sealing surface and having an annular working face in cooperative association with said circular sealing surface, a first resilient seal ring in sealing engagement between said annular working face and said circular sealing surface, and a second resilient seal ring in annular sealing engagement between said seat ring cylindrical face and said other member, the mean diameter of said first seal ring being greater than the diameter of the annular sealing engagement of said second seal ring, the cylindrical surface of said seat ring other than said cylindrical face and the annular face of said seat ring other than said annular working face being free of sealing means with said outer and inner members to enable free flow of fluid across said other cylindrical surface between said annular faces and said other cylindrical surface being exposed to pressure within said outer member.

10. A structure of the rotatable value type comprising:

an outer body member having inlet and outlet openings, an inner member rotatable in said body member and having surfaces thereon alignable with said inlet and said outlet openings, a flat circular sealing surface on one of said outer and inner members, an outer cylindrical sealing surface on the other of said outer and inner members, said sealing surfaces being concentric with the axis of rotation of said inner member, an annular seat ring having an annular working face and a cylindical working face in cooperative association with said circular and cylindrical sealing surfaces, respectively, a circular recess in each of said annular and cylindrical working faces, resilient seal rings disposed in said recesses in sealing engagement with said cylindrical and flat circular sealing surfaces, the mean diameter of the seal ring engaging said flat circular sealing surface being greater than the diameter of said cylindrical sealing surface.

11. A structure of the rotatable value type comprising:

an outer body member having inlet and outlet openings, an inner member rotatable in said body member and having surfaces thereon alignable with said inlet and said outlet passages, a flat circular sealing surface on one of said outer and inner members, an outer cylindrical sealing surface on the other one of said outer and inner members, said sealing surfaces being concentric with the axis of rotation of said inner member, an annular seat ring having an internal cylindrical working face slidable on said cylindrical sealing surfaces and an annular working face opposing said circular sealing surface, a circular recess in each of said annular and internal cylindrical working faces, resilient seal rings disposed in said recesses in sealing engagement with said cylindrical and flat circular sealing surfaces, the mean diameter of the seal ring engaging said flat circular sealing surface being greater than the diameter of said cylindrical sealing surface, the outer cylindrical surface of said seat ring and the annular face of said seat ring other than said annular working face being free of sealing means with said outer and inner members to enable free flow of fluid across said outer cylindrical surface between said annular faces, and said outer cylindrical surfaces being exposed to pressure within said outer body member.

12. The structure defined in claim 11 including resilient means biasing said seat ring against said flat seating surface.

13. A structure of the rotatable valve type comprising:

an outer body member having inlet and outlet openings, an inner member rotatable in said body member and having surfaces thereon alignable with said inlet and said outlet openings, a circular sealing surface on one of said outer and inner members, a cylindrical sealing surface on the other of said outer and inner members, said sealing surfaces being disposed around the axis of rotation of said inner member, an annular seat ring having a cylindrical face slidable on said cylindrical sealing surface and having an annular working face in cooperative association with said circular sealing surface, an annular recess around said cylindrical face, a first resilient seal ring in sealing engagement between said annular working face and said circular sealing surface, and a second resilient seal ring in said annular recess in sealing engagement between said seat ring and said other member, the cylindrical surfaces of said seat ring other than said cylindrical face and the annular face of said seat ring other than said annular working face being free of sealing means with said outer and inner members to enable free flow of fluid across said other cylindrical surface between said annular faces, and said other cylindrical surface being exposed to pressure within said outer member.

References Cited in the file of this patent

UNITED STATES PATENTS

| | | |
|---|---|---|
| 1,354,539 | Dickerson | Oct. 5, 1920 |
| 1,879,481 | Putnam | Sept. 27, 1932 |
| 2,054,369 | Francis | Sept. 15, 1936 |
| 2,191,232 | Heinen | Feb. 20, 1940 |
| 2,696,967 | Wilson | Dec. 14, 1954 |
| 2,734,715 | Knox | Feb. 14, 1956 |
| 2,796,230 | Grove | June 18, 1957 |
| 2,800,295 | Thomas | July 23, 1957 |
| 2,809,011 | Davis | Oct. 8, 1957 |
| 2,837,308 | Shand | June 3, 1958 |
| 2,839,074 | Kaiser | June 17, 1958 |
| 2,963,260 | Siravo | Dec. 6, 1960 |
| 2,963,261 | Holl | Dec. 6, 1960 |
| 3,068,887 | Grove | Dec. 18, 1962 |